United States Patent
Horng et al.

(10) Patent No.: US 7,919,893 B2
(45) Date of Patent: Apr. 5, 2011

(54) PERMANENT MAGNET ROTOR WITH ANNULAR RIB COUPLING

(75) Inventors: Alex Horng, Kaohsiung (TW); Chih-Wen Wu, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 237 days.

(21) Appl. No.: 12/142,864

(22) Filed: Jun. 20, 2008

(65) Prior Publication Data

US 2009/0284095 A1  Nov. 19, 2009

(30) Foreign Application Priority Data

May 14, 2008  (TW) .............................. 97117705 A (51) Int. Cl.
*H02K 1/30* (2006.01)
*H02K 1/27* (2006.01)

(52) U.S. Cl. ............ 310/156.26; 310/156.13; 310/67 R; 310/156.11; 310/156.12

(58) Field of Classification Search ............ 310/156.08, 310/156.12–156.15, 236, 266, 267, 26, 156.26, 310/67 R See application file for complete search history.

(56) References Cited

U.S. PATENT DOCUMENTS

| | | | |
|---|---|---|---|
| 6,093,984 A * | 7/2000 | Shiga et al. ..................... 310/26 |
| 6,362,551 B1 | 3/2002 | Horng | |
| 6,674,204 B1 * | 1/2004 | Horng et al. ............. 310/156.12 |
| 6,926,498 B2 * | 8/2005 | Li et al. .............................. 416/3 |
| 7,112,906 B2 * | 9/2006 | Chou et al. .............. 310/156.12 |
| 7,500,848 B2 | 3/2009 | Maeda et al. | |
| 7,511,401 B2 | 3/2009 | Yang et al. | |
| 7,514,832 B2 | 4/2009 | Durham et al. | |
| 2001/0048259 A1 * | 12/2001 | Ueda ......................... 310/154.09 |
| 2002/0171307 A1 * | 11/2002 | Verbrugge et al. ....... 310/156.12 |
| 2003/0011264 A1 * | 1/2003 | Du ............................ 310/156.08 |
| 2004/0075356 A1 | 4/2004 | Horng et al. | |
| 2005/0006962 A1 | 1/2005 | Horng | |
| 2005/0012418 A1 * | 1/2005 | Chou et al. .............. 310/156.08 |
| 2005/0127768 A1 | 6/2005 | Welke et al. | |
| 2006/0087195 A1 | 4/2006 | Gorit | |
| 2006/0185751 A1 | 8/2006 | Kondou et al. | |

FOREIGN PATENT DOCUMENTS

TW            490912        6/2002

* cited by examiner

*Primary Examiner* — Karl I Tamai
*Assistant Examiner* — Terrance Kenerly
(74) *Attorney, Agent, or Firm* — Alan Kamrath; Kamrath & Associates PA (57) ABSTRACT

A motor rotor includes a hub having a peripheral wall. A metal ring includes an engaging portion. The metal ring is formed by bending a strip of metal plate to form a cylindrical ring. The metal plate includes first and second positioning portions on two ends thereof. The first and second positioning portions are coupled with each other to form the engaging portion. The metal ring is coupled to an inner peripheral face of the peripheral wall of the hub. A magnet ring is coupled to an inner peripheral face of the metal ring.

24 Claims, 9 Drawing Sheets

PERMANENT MAGNET ROTOR WITH ANNULAR RIB COUPLING

BACKGROUND OF THE INVENTION

The present invention relates to a motor rotor and, more particularly, to a motor rotor including a metal ring providing a magnetically sealing effect for a magnet ring.

Figure 1:
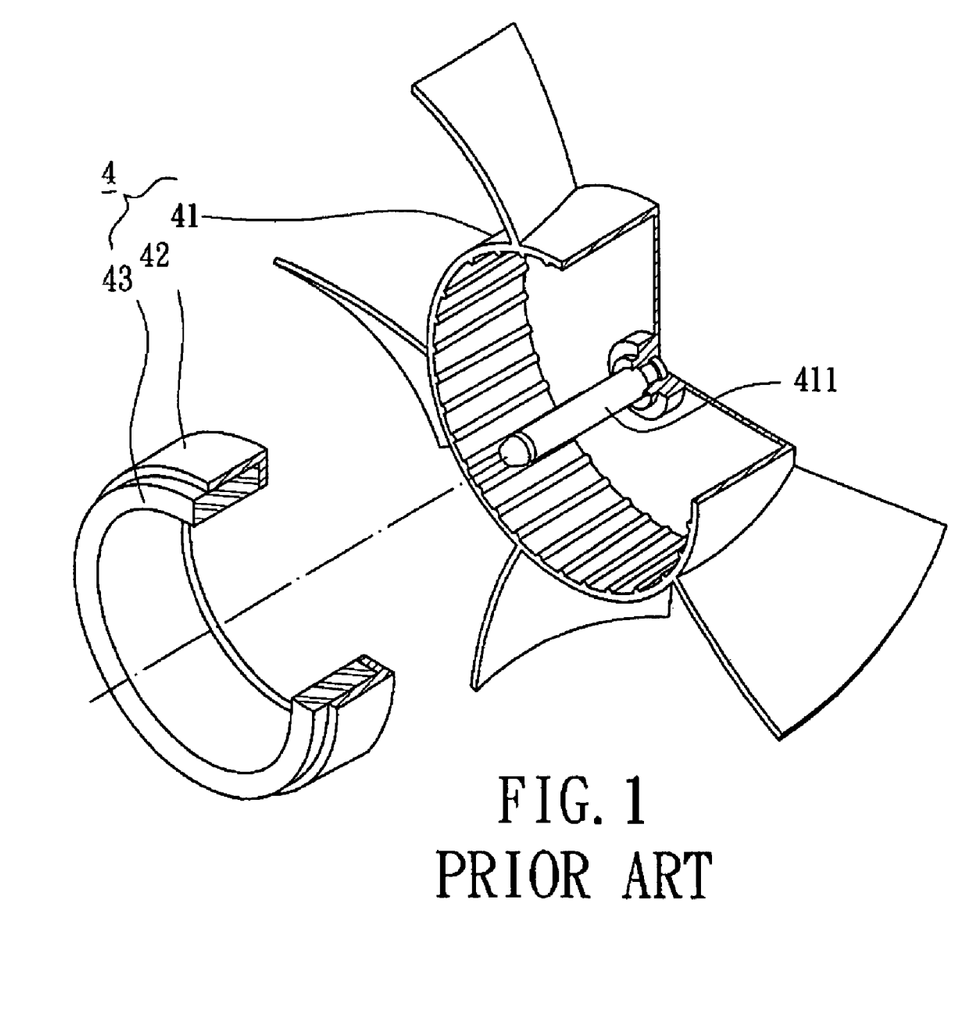
FIG. 1 shows an exploded, partly-cutaway, perspective view of a conventional motor rotor.
Figure 2:
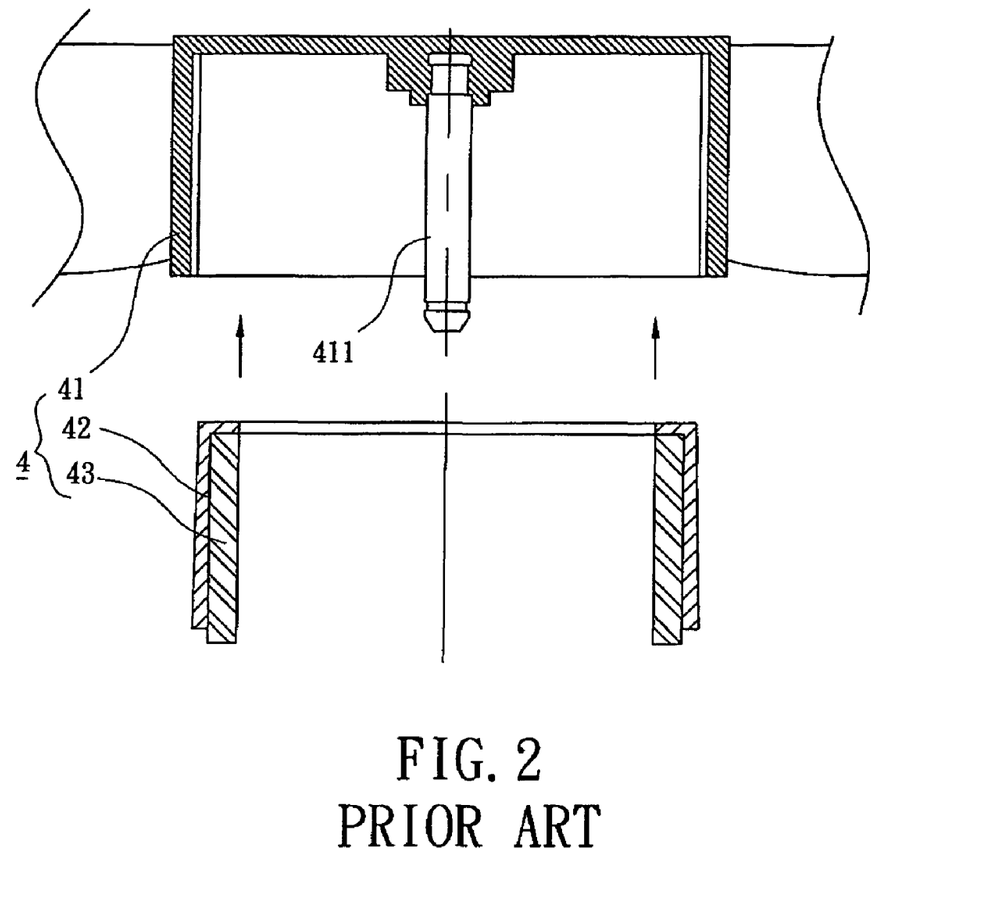
FIG. 2 shows a partial, exploded, cross-sectional view of the motor rotor of FIG. 1, illustrating assembly of the motor rotor.

FIGS. 1 and 2 show a conventional motor rotor 4 including a hub 41 having a shaft 411 mounted to a center thereof, a metal ring 42 mounted to an inner periphery of a peripheral wall of the hub 41, and a magnet ring 43 mounted to an inner periphery of the metal ring 42. The metal ring 42 includes inverted L-shaped cross sections to provide reliable engagement with the hub 41. The metal ring 42 between the hub 41 and the magnet ring 43 provides a magnetically sealing effect for the magnet ring 43. However, formation of the metal ring 42 with inverted L-shaped cross sections requires several punching processes, leading to troublesome processing and waste of material. As a result, the manufacturing costs of the motor rotor 4 are increased while wasting material.

Figure 3:
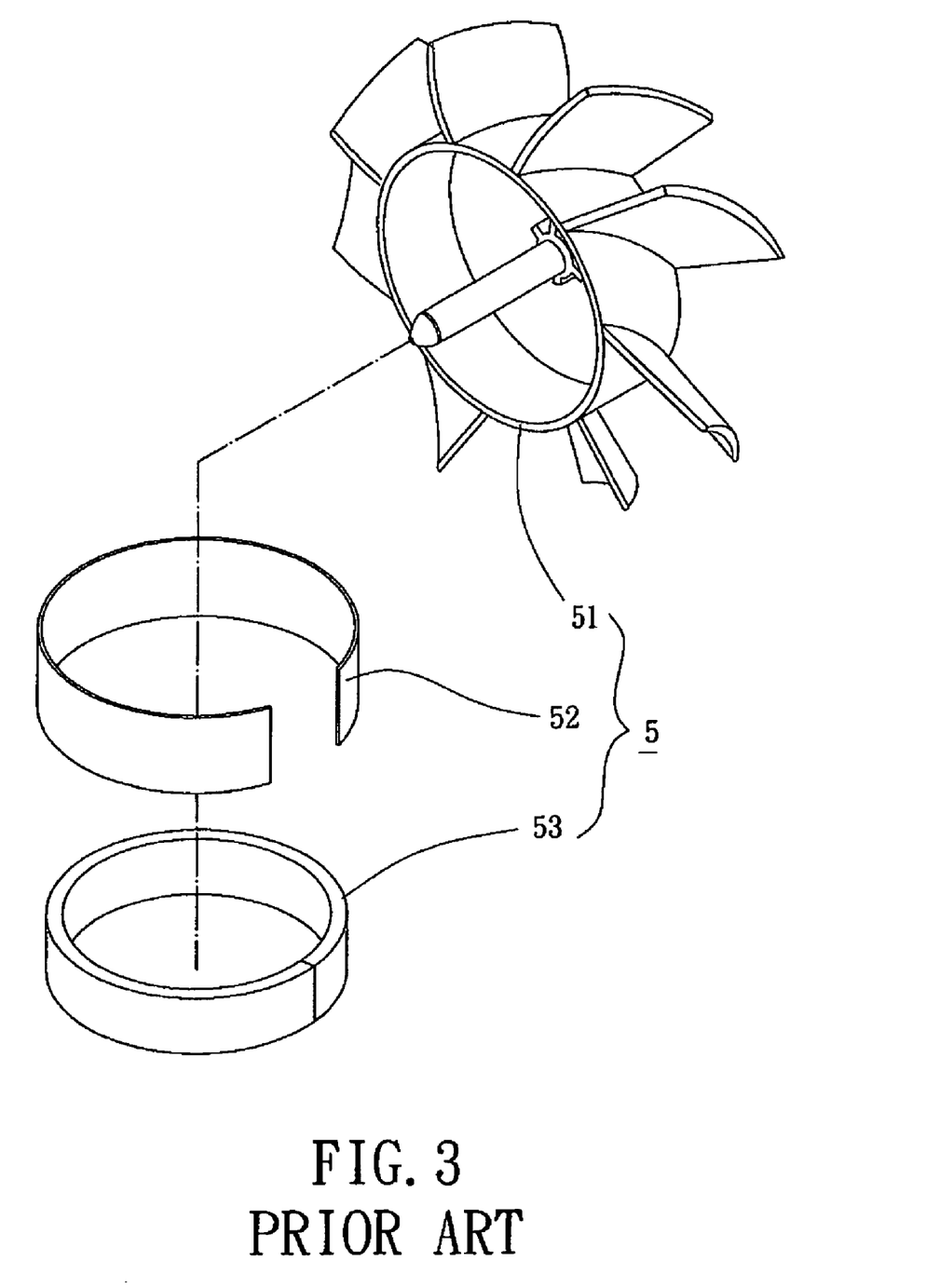
FIG. 3 shows an exploded, perspective view of another conventional motor rotor.
Figure 4:
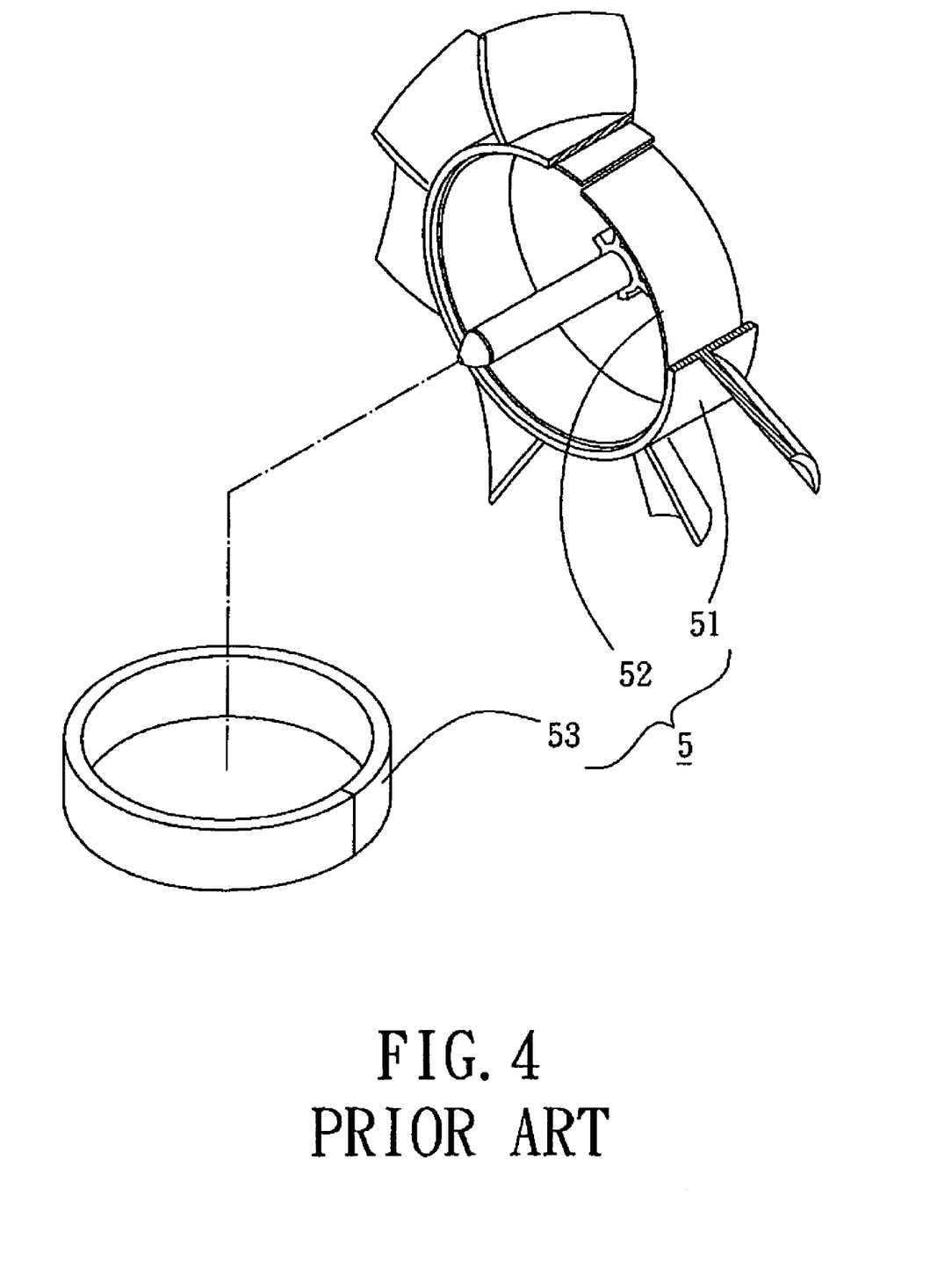
FIG. 4 shows a partly exploded, perspective view of the motor rotor of FIG. 3 with a hub of the motor rotor partly cutaway to show axial shift of an end of a metal ring of the motor rotor.

FIGS. 3 and 4 show another conventional motor rotor 5 including a hub 51, a metal ring 52, and a magnet ring 53. The metal ring 52 is formed by bending a strip of metal plate having a length equal to or slightly smaller than the inner periphery of the peripheral wall of the hub 51. The metal ring 52 is mounted to the inner periphery of the peripheral wall of the hub 51 and exerts a radially expanding force to and is thus in tight contact with the inner periphery of the peripheral wall of the hub 51. Two ends of the magnet ring 53 can be in contact with or spaced from each other. The magnet ring 53 is then tightly fitted onto the inner periphery of the metal ring 52. Such a motor rotor 5 is disclosed in U.S. Pat. No. 6,362,551 issued Mar. 26, 2002. Formation of the metal ring 52 by bending a strip of metal plate avoids waste of material while allowing easy manufacturing. However, the ends of the metal ring 52 are not positioned and, thus, liable to shift in the axial direction (see FIG. 4), leading to difficulty to subsequent assembly of the magnet ring 53 as well as an adverse affect to rotational stability of the rotor 5. assembly of the magnet ring 53 as well as adverse affect to rotational stability of the rotor 5.

BRIEF SUMMARY OF THE INVENTION

An objective of the present invention is to provide a metal ring for a motor rotor that allows easy assembly of the motor rotor while providing enhanced positioning effect for the metal ring as well as enhanced rotational stability for the motor rotor.

Another objective of the present invention is to provide a metal ring that can be securely coupled to a hub to provide enhanced coupling therebetween.

A motor rotor according to the preferred teachings of the present invention includes a hub having a peripheral wall. A metal ring includes an engaging portion. The metal ring is formed by bending a strip of metal plate to form a cylindrical ring. The metal plate includes first and second positioning portions on two ends thereof. The first and second positioning portions are coupled with each other to form the engaging portion. The metal ring is coupled to an inner peripheral face of the peripheral wall of the hub. A magnet ring is coupled to an inner peripheral face of the metal ring.

The metal ring can include a coupling section on an outer peripheral face thereof. In a preferred form, the coupling section includes a plurality of grooves, and the inner peripheral face of the peripheral wall of the hub includes a plurality of annular ribs coupled in the plurality of grooves. In another preferred form, the coupling section includes a plurality of ribs, and the inner peripheral face of the peripheral wall of the hub includes a plurality of annular grooves receiving the plurality of ribs. In a further preferred form, the coupling section is a rugged face coupled with the inner peripheral face of the peripheral wall of the hub.

In a preferred form, the first positioning portion includes a protrusion, and the second positioning portion includes a groove receiving the protrusion. In another preferred form, the first positioning portion is serrated and includes a plurality of first protrusions and a plurality of first grooves, and the second positioning portion is serrated and includes a plurality of second protrusions received in the plurality of first grooves and a plurality of second grooves receiving the plurality of first protrusions.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

All figures are drawn for ease of explanation of the basic teachings of the present invention only; the extensions of the Figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "end", "portion", "section", "annular", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

A motor rotor of a first embodiment according to the preferred teachings of the present invention is shown in FIGS. 5-8 and 11 of the drawings. According to the preferred form shown, the motor rotor includes a hub 1, a metal ring 2, and a magnet ring 3. The metal ring 2 and the magnet ring 3 are mounted in the hub 1, with the metal ring 2 between the hub 1 and the magnet ring 3 to provide a magnetically sealing effect for the magnet ring 3. The motor rotor according to the preferred teachings of the present invention can be coupled with a stator to form a motor.

Figure 5:
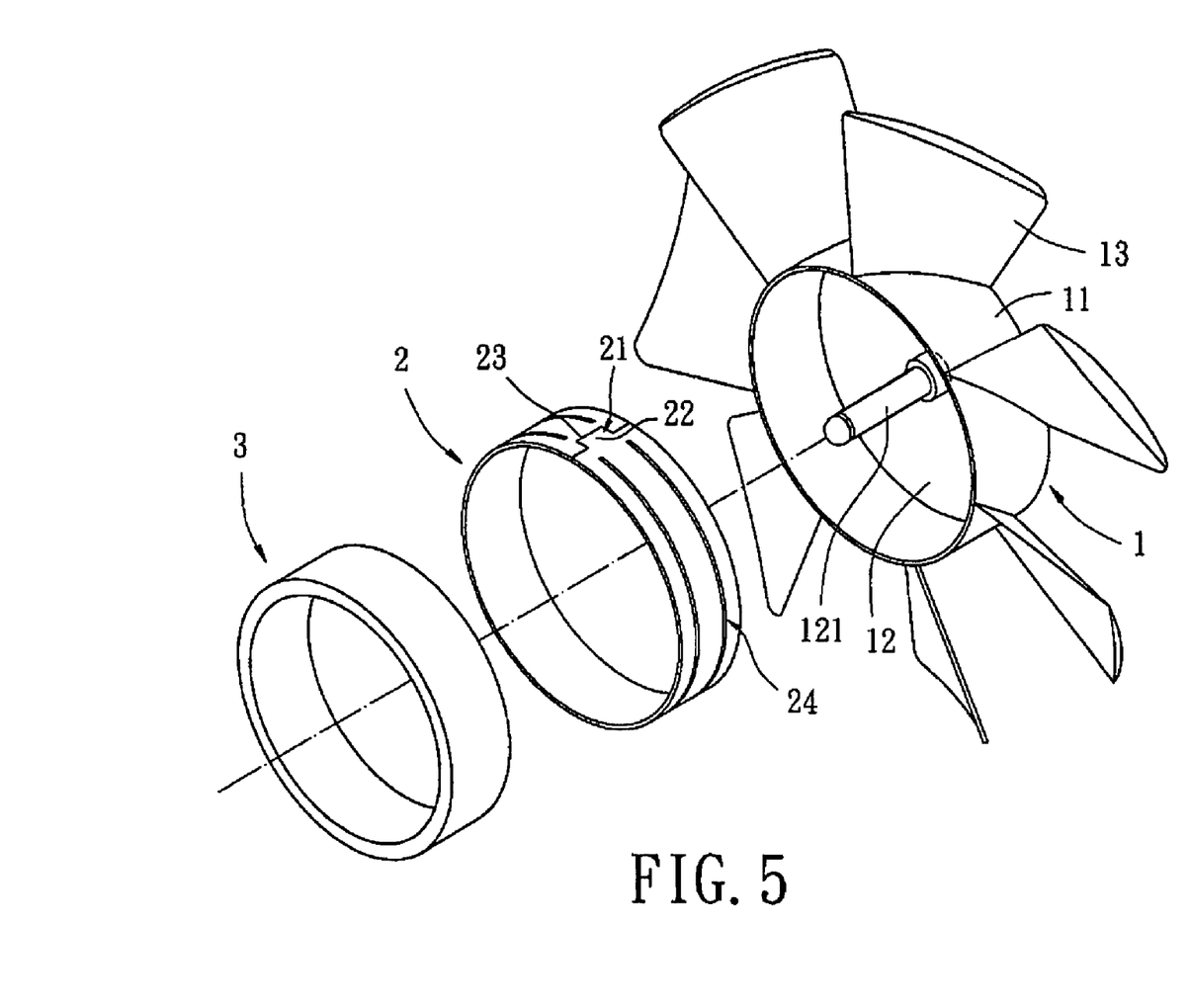
FIG. 5 shows an exploded, perspective view of a motor rotor of a first embodiment according to the preferred teachings of the present invention.
Figure 6:
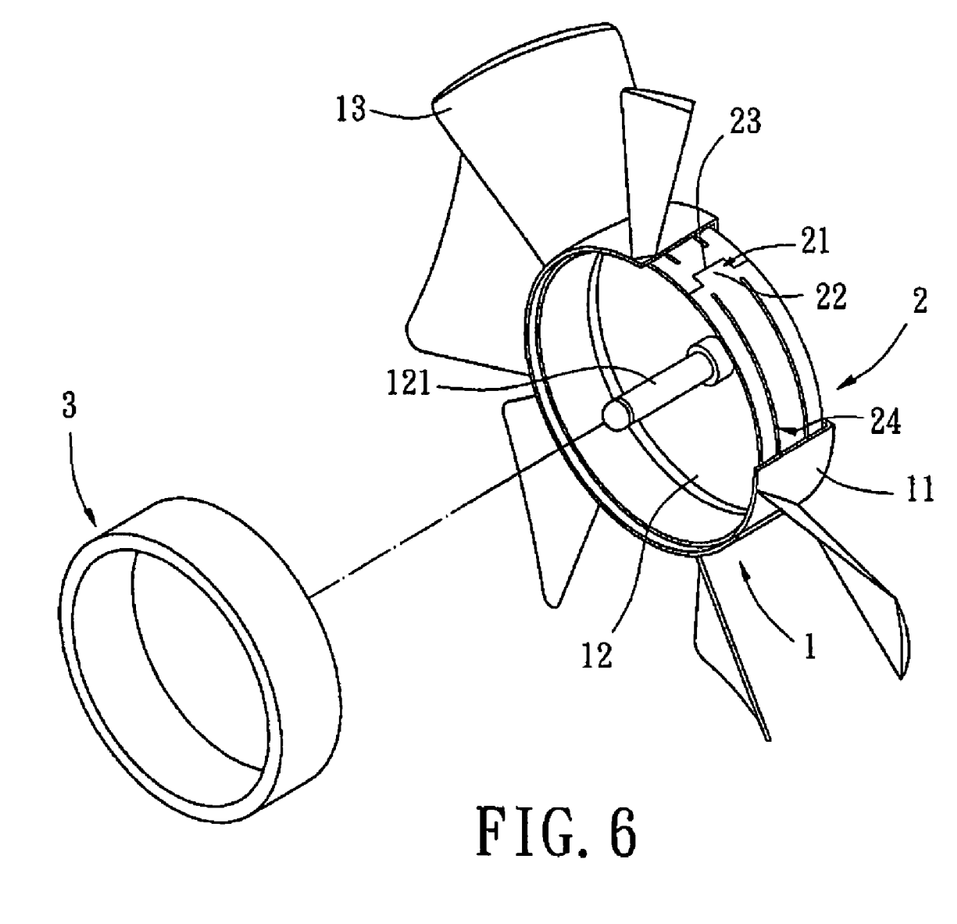
FIG. 6 shows a partly exploded, perspective view of the motor rotor of FIG. 5 with a hub of the motor rotor partly cutaway.

According to the preferred form shown, the hub 1 includes a peripheral wall 11 and a closed end wall 12 on an end of the peripheral wall 11, with the other end of the peripheral wall 11 being open. A shaft 121 is mounted to a center of the closed end wall 12 and extends in an interior space defined by the peripheral wall 11. A plurality of vanes 13 are formed on an outer peripheral face of the peripheral wall 11 of the hub 1 to form an impeller.

According to the preferred form shown, the metal ring 2 includes an engaging portion 21 and is formed by bending a strip of metal plate 2' to form a cylindrical ring. The metal plate 2' includes first and second positioning portions 22 and 23 respectively on two ends thereof. The first and second positioning portions 22 and 23 can be coupled together by protrusion-and-groove engagement, coupling, riveting or welding so that the engaging portion 21 is formed at a coupling area of the first and second positioning portions 22 and 23, assuring formation of a stable cylindrical metal ring 2. According to the most preferred form shown, a coupling section 24 is formed on an outer peripheral face of the metal ring 2 to increase a coupling area between the hub 1 and the metal ring 2, providing enhanced positioning effect between the hub 1 and the metal ring 2.

The magnet ring 3 can be made of a strip of plastic or rubber magnetic material or a strip of magnet made of an appropriate material, with two ends of the strip of magnet coupling with each other to form a cylindrical ring. According to the preferred form shown, the magnet ring 3 is mounted to an inner peripheral face of the metal ring 2.

Figure 7:
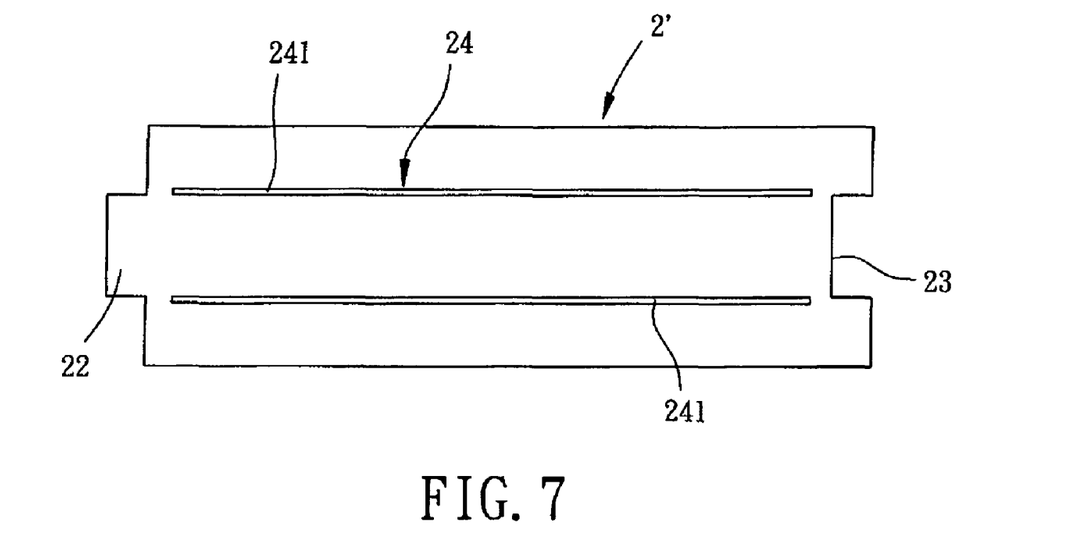
FIG. 7 shows a plan view of a metal plate for forming a metal ring of the motor rotor of FIG. 5.
Figure 8:
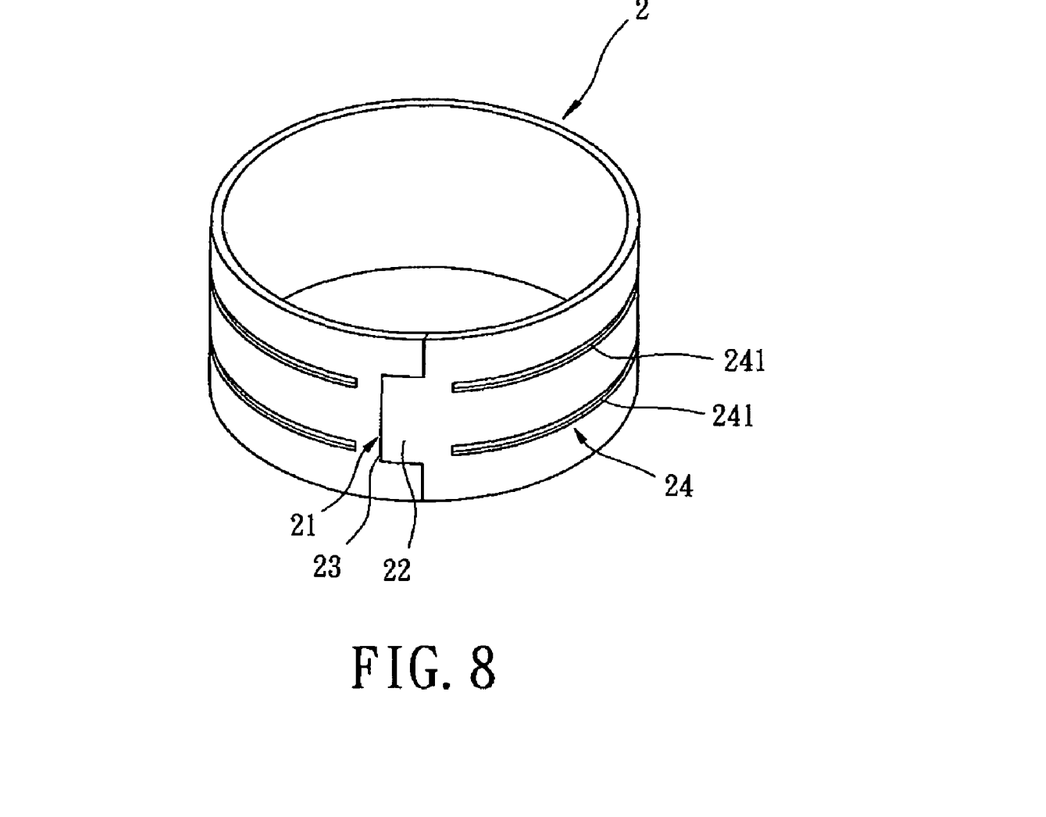
FIG. 8 shows a perspective view of the metal ring of FIG. 5.

According to a preferred form shown in FIGS. 7 and 8, the first positioning portion 22 of the metal plate 2' includes a protrusion, and the second positioning portion 23 of the metal plate 2' includes a groove. The protrusion is coupled in the groove after the metal plate 2' is bent to form a cylindrical ring while forming the engaging portion 21. The engaging portion 21 can be fixed by riveting to assure a stable cylindrical metal ring 2. Furthermore, the coupling section 24 of the metal ring 2 is in the form of a plurality of grooves 241 extending from the first positioning portion 22 to the second positioning portion 23. The peripheral wall 11 of the hub 1 includes a plurality of annular ribs 14 (FIG. 11) on an inner peripheral face thereof. The annular ribs 14 are coupled in the grooves 241 to increase the coupling area between the hub 1 and the metal ring 2, providing enhanced positioning effect between the hub 1 and the metal ring 2.

Figure 9:
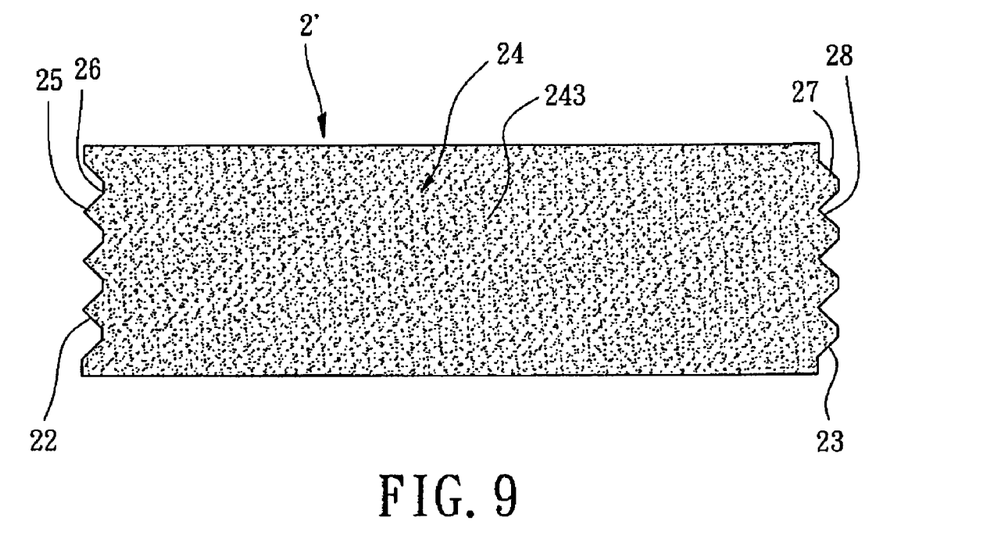
FIG. 9 shows a plan view of another metal plate for forming a metal ring of the motor according to the preferred teachings of the present invention.
Figure 10:
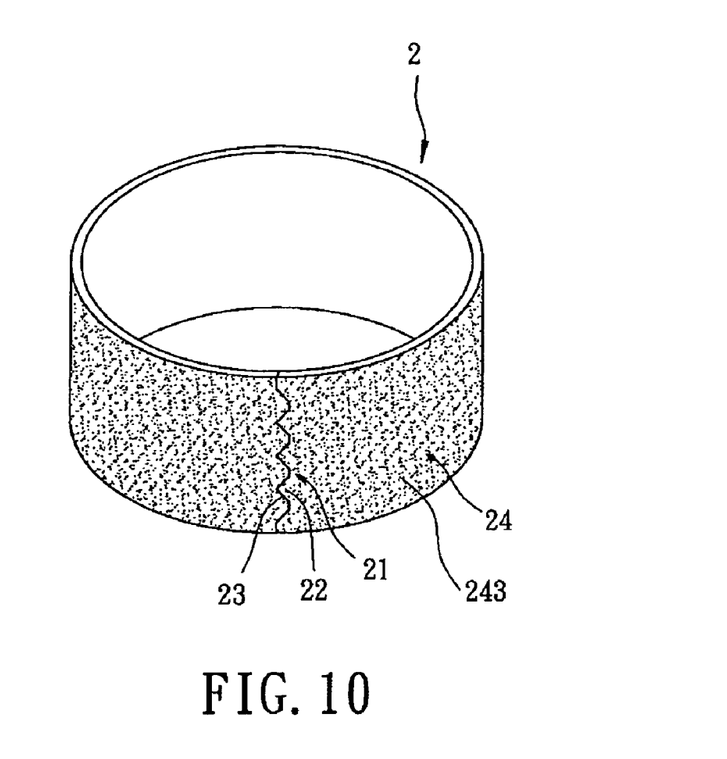
FIG. 10 shows a perspective view of a metal ring formed by the metal plate of FIG. 9.
Figure 11:
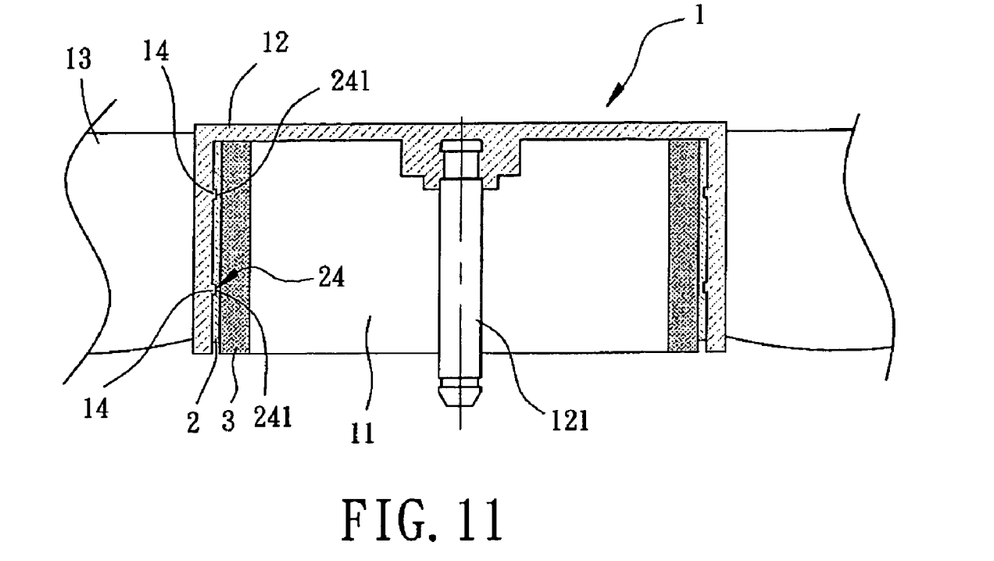
FIG. 11 shows a partial, cross-sectional view of the motor rotor of FIG. 5 after assembly.

According to another preferred form shown in FIGS. 9 and 10, the first positioning portion 22 of the metal plate 2' is serrated and includes a plurality of protrusions 25 and grooves 26, and the second positioning portion 23 of the metal plate 2' is also serrated and includes a plurality of protrusions 27 and grooves 28, in which the protrusions 25 are coupled in the grooves 28 and the protrusions 27 are coupled in the grooves 26 after the metal plate 2' is bent to form a cylindrical ring, forming the engaging portion 21. Thus, a stable cylindrical metal ring 2 is provided due to provision of the engaging portion 21. Furthermore, the coupling section 24 of the metal ring 2 is in the form of a rugged face 243 to further increase the coupling area between the hub 1 and the metal ring 2, providing further enhanced positioning effect between the hub 1 and the metal ring 2.

Figure 12:
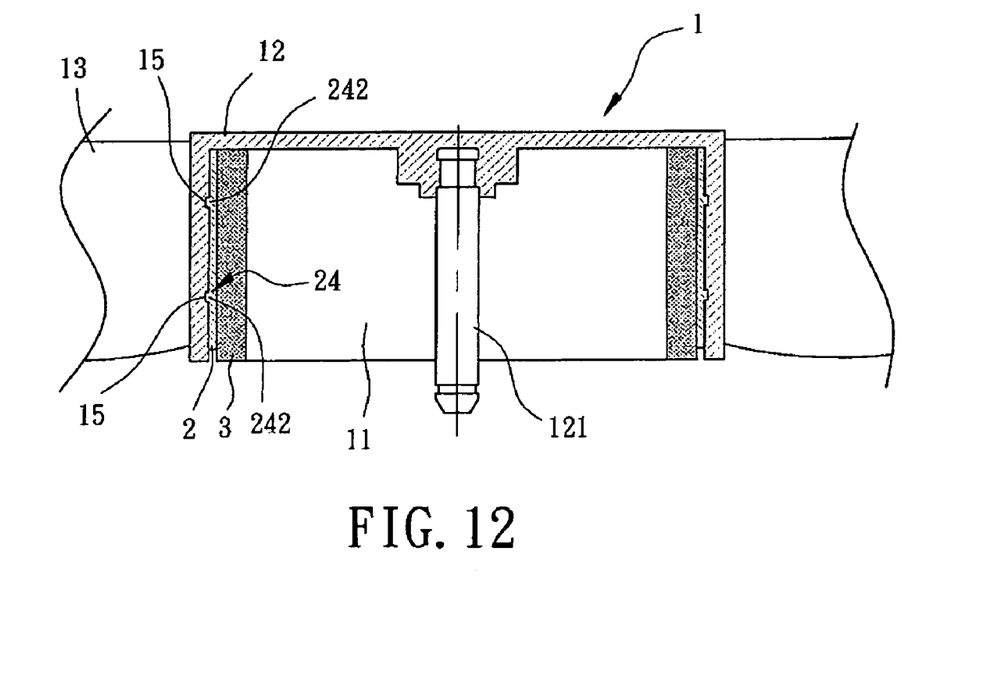
FIG. 12 shows a partial, cross-sectional view of a motor rotor of a second embodiment according to the preferred teachings of the present invention.

In another preferred form shown in FIG. 12, the coupling section 24 of the metal ring 2 is in the form of a plurality of ribs 242 extending from the first positioning portion 22 to the second positioning portion 23. The peripheral wall 11 of the hub 1 includes a plurality of annular grooves 15 on the inner peripheral face thereof. The ribs 242 are coupled in the annular grooves 15 to increase the coupling area between the hub 1 and the metal ring 2, providing enhanced positioning effect between the hub 1 and the metal ring 2.

It can be appreciated that the above-mentioned examples of the coupling section 24 can be selectively combined with the above-mentioned examples of the first and second positioning portions 22 and 23 to provide various combinations, forming motor rotors with enhanced functions. As an example, the metal ring 2 having a single protrusion and a single groove can include the grooves 241, the ribs 242, or the rugged face 243. As another example, the metal ring 2 having serrated positioning portions 22 and 23 can include the grooves 241, the ribs 242, or the rugged face 243.

Since the metal ring 2 of the motor rotor according to the preferred teachings of the present invention is formed by bending a strip of metal plate 2', there is no waste material, and manufacturing is easy. Furthermore, after the metal plate 2' is bent to form a cylindrical ring, the engaging portion 21 formed by the first and second positioning portions 22 and 23 assures a stable cylindrical metal ring 2, enhancing the assembling convenience and enhancing rotational stability of a motor formed by coupling a stator with the motor rotor according to the preferred teachings of the present invention. The coupling section 24 on the outer peripheral face of the metal ring 2 provides enhanced positioning effect between the hub 1 and the metal ring 2, assuring quality of the motor rotor according to the preferred teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:
1. A motor rotor comprising:
a hub including a peripheral wall having an inner peripheral face;
a metal ring including an engaging portion and an inner peripheral face, with the metal ring being formed by bending a strip of metal plate to form a cylindrical ring, with the metal plate including first and second positioning portions on two ends thereof, with the first and second positioning portions being coupled with each other to form the engaging portion, with the metal ring including a coupling section on an outer peripheral face thereof, with the coupling section extending from the first positioning portion to the second positioning portion, and with the coupling section being coupled to the inner peripheral face of the peripheral wall of the hub; and a magnet ring coupled to the inner peripheral face of the metal ring, wherein the coupling section includes a plurality of grooves, and the inner peripheral face of the peripheral wall of the hub includes a plurality of annular ribs coupled in the plurality of grooves.

2. The motor rotor as claimed in claim 1, with the coupling section being a rugged face coupled with the inner peripheral face of the peripheral wall of the hub.

3. The motor rotor as claimed in claim 1, with the first positioning portion including a protrusion, and with the second positioning portion including a groove receiving the protrusion.

4. The motor rotor as claimed in claim 1, with the first positioning portion being serrated and including a plurality of first protrusions and a plurality of first grooves, and with the second positioning portion being serrated and including a plurality of second protrusions received in the plurality of first grooves and a plurality of second grooves receiving the plurality of first protrusions.

5. The motor rotor as claimed in claim 1, with the hub further including a closed end wall on an end of the peripheral wall, and with the motor rotor further comprising, in combination: a shaft coupled to a center of the closed end wall.

6. The motor rotor as claimed in claim 1, with the peripheral wall of the hub further including a plurality of vanes formed on an outer peripheral face thereof.

7. The motor rotor as claimed in claim 1 wherein each of the plurality of grooves are annular.

8. A motor rotor comprising:
a hub including a peripheral wall having an inner peripheral face;
a metal ring including an engaging portion and an inner peripheral face, with the metal ring being formed by bending a strip of metal plate to form a cylindrical ring, with the metal plate including first and second positioning portions on two ends thereof, with the first and second positioning portions being coupled with each other to form the engaging portion, with the metal ring including a coupling section on an outer peripheral face thereof, with the coupling section extending from the first positioning portion to the second positioning portion, and with the coupling section being coupled to the inner peripheral face of the peripheral wall of the hub; and
a magnet ring coupled to the inner peripheral face of the metal ring, wherein the coupling section includes a plurality of ribs, and the inner peripheral face of the peripheral wall of the hub includes a plurality of annular grooves receiving the plurality of ribs.

9. The motor rotor as claimed in claim 8 wherein each of the plurality of ribs are annular.

10. The motor rotor as claimed in claim 8, with the coupling section being a rugged face coupled with the inner peripheral face of the peripheral wall of the hub.

11. The motor rotor as claimed in claim 8, with the first positioning portion including a protrusion, and with the second positioning portion including a groove receiving the protrusion.

12. The motor rotor as claimed in claim 8, with the first positioning portion being serrated and including a plurality of first protrusions and a plurality of first grooves, and with the second positioning portion being serrated and including a plurality of second protrusions received in the plurality of first grooves and a plurality of second grooves receiving the plurality of first protrusions.

13. The motor rotor as claimed in claim 8, with the hub further including a closed end wall on an end of the peripheral wall, and with the motor rotor further comprising, in combination: a shaft coupled to a center of the closed end wall.

14. The motor rotor as claimed in claim 8, with the peripheral wall of the hub further including a plurality of vanes formed on an outer peripheral face thereof.

15. A metal ring for a motor rotor having a hub and a magnet ring, with the hub including a peripheral wall having an inner peripheral face, with the magnet ring being mounted in the peripheral wall, with the metal ring being adapted to be coupled between the peripheral wall of the hub and the magnet ring and to provide a magnetically sealing effect for the magnet ring, with the metal ring including an engaging portion and an inner peripheral face, with the metal ring being formed by bending a strip of metal plate to form a cylindrical ring, with the metal plate including first and second positioning portions on two ends thereof, with the first and second positioning portions being coupled with each other to form the engaging portion, with the metal ring including a coupling section on an outer peripheral face thereof, with the coupling section extending from the first positioning portion to the second positioning portion, with the coupling section including a plurality of grooves adapted to be coupled with a plurality of annular ribs formed on the inner peripheral face of the peripheral wall of the hub, and with the metal ring being coupled to the inner peripheral face of the peripheral wall of the hub through the coupling section.

16. The metal ring as claimed in claim 15, with the coupling section being a rugged face adapted to be coupled with the inner peripheral face of the peripheral wall of the hub.

17. The metal ring as claimed in claim 15, with the first positioning portion including a protrusion, and with the second positioning portion including a groove receiving the protrusion.

18. The metal ring as claimed in claim 15, with the first positioning portion being serrated and including a plurality of first protrusions and a plurality of first grooves, and with the second positioning portion being serrated and including a plurality of second protrusions received in the plurality of first grooves and a plurality of second grooves receiving the plurality of first protrusions.

19. The metal ring as claimed in claim 15 wherein each of the plurality of grooves are annular.

20. A metal ring for a motor rotor having a hub and a magnet ring, with the hub including a peripheral wall having an inner peripheral face, with the magnet ring being mounted in the peripheral wall, with the metal ring being adapted to be coupled between the peripheral wall of the hub and the magnet ring and to provide a magnetically sealing effect for the magnet ring, with the metal ring including an engaging portion and an inner peripheral face, with the metal ring being formed by bending a strip of metal plate to form a cylindrical ring, with the metal plate including first and second positioning portions on two ends thereof, with the first and second positioning portions being coupled with each other to form the engaging portion, with the metal ring including a coupling section on an outer peripheral face thereof, with the coupling section extending from the first positioning portion to the second positioning portion, with the coupling section including a plurality of ribs adapted to be coupled with a plurality of annular grooves formed in the inner peripheral face of the peripheral wall of the hub, and with the metal ring being coupled to the inner peripheral face of the peripheral wall of the hub through the coupling section.

21. The metal ring as claimed in claim 20 wherein each of the plurality of ribs are annular.

22. The metal ring as claimed in claim 20, with the coupling section being a rugged face adapted to be coupled with the inner peripheral face of the peripheral wall of the hub.

23. The metal ring as claimed in claim 20, with the first positioning portion including a protrusion, and with the second positioning portion including a groove receiving the protrusion.

24. The metal ring as claimed in claim 20, with the first positioning portion being serrated and including a plurality of first protrusions and a plurality of first grooves, and with the second positioning portion being serrated and including a plurality of second protrusions received in the plurality of first grooves and a plurality of second grooves receiving the plurality of first protrusions.

* * * * *